US012138647B2

(12) United States Patent
Hudson et al.

(10) Patent No.: US 12,138,647 B2
(45) Date of Patent: *Nov. 12, 2024

(54) PAINT DISPENSING METHOD AND APPARATUS INVOLVING A VIBRATING MEMBRANE

(71) Applicant: SWIMC, LLC, Cleveland, OH (US)

(72) Inventors: Richard D. Hudson, Warrensville Heights, OH (US); Morgan S. Sibbald, Warrensville Heights, OH (US)

(73) Assignee: SWIMC, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,553

(22) Filed: Sep. 11, 2023

(65) Prior Publication Data

US 2023/0415189 A1 Dec. 28, 2023

Related U.S. Application Data

(63) Continuation of application No. 16/822,959, filed on Mar. 18, 2020, now Pat. No. 11,779,950.

(Continued)

(51) Int. Cl.
*B05B 17/00* (2006.01)
*B05B 17/06* (2006.01)

(52) U.S. Cl.
CPC ...... *B05B 17/0646* (2013.01); *B05B 17/0661* (2013.01)

(58) Field of Classification Search
CPC ............ B05B 17/0676; B05B 17/0646; B05B 17/0661; B05B 17/0607; B05B 11/0054;

(Continued)

(56) References Cited

U.S. PATENT DOCUMENTS 3,648,929 A * 3/1972 Corbaz ............... B05B 17/0623 239/376
11,779,950 B2 * 10/2023 Hudson ............... B05B 17/0646 239/102.2

(Continued)

FOREIGN PATENT DOCUMENTS

WO 2006006963 A2 1/2006

OTHER PUBLICATIONS

International Search Report filed in the corresponding PCT application dated May 11, 2020; 4 pages.

(Continued)

*Primary Examiner* — Christopher R Dandridge
(74) *Attorney, Agent, or Firm* — Black McCuskey

(57) ABSTRACT

A fluid dispensing apparatus and liquid container with a fluid dispensing apparatus are provided. The fluid dispensing apparatus includes a valve body defining a bore that extends at least partially through a valve body, and an adaptor including a piercing member positioned to pierce a pierceable membrane enclosing the liquid container. The adaptor also includes a releasable fastener that cooperates with a portion of the liquid container to releasably couple the valve body to the liquid container. A liquid droplet production apparatus of the fluid dispensing apparatus controls a discharge of the liquid from the liquid container. The liquid droplet production apparatus includes a perforate membrane, and an actuator that is selectively operable to vibrate the perforate membrane and cause liquid droplets to be emitted from the perforate membrane and projected generally away from the liquid container.

20 Claims, 9 Drawing Sheets

Related U.S. Application Data

(60) Provisional application No. 62/819,886, filed on Mar. 18, 2019.

(58) Field of Classification Search
CPC .. B65D 83/203; B65D 83/207; B65D 83/382; B65D 83/687; B65D 83/205
See application file for complete search history.

(56) References Cited

U.S. PATENT DOCUMENTS

| | | | | |
|---|---|---|---|---|
| 2013/0079733 | A1 * | 3/2013 | Burt | B08B 3/12 239/102.1 |
| 2017/0028417 | A1 * | 2/2017 | Johnson | B65D 83/207 |

OTHER PUBLICATIONS

Written Opinion filed in the corresponding PCT application dated May 11, 2020; 5 pages.
International Preliminary Report on Patentability filed in the corresponding PCT application dated May 11, 2020; 6 pages.

* cited by examiner

PAINT DISPENSING METHOD AND APPARATUS INVOLVING A VIBRATING MEMBRANE

CROSS REFERENCE TO RELATED APPLICATIONS

This application is a continuation divisional continuation-in-part of U.S. patent application Ser. No. 16/822,959 filed Mar. 18, 2020 that claims the benefit of Provisional Application No. 62/819,886 filed Mar. 18, 2019. The contents of the aforementioned application/are hereby incorporated by reference herein in its/their entirety.

TECHNICAL FIELD

The present disclosure relates generally to methods and apparatuses for dispensing paint from pressurized or unpressurized paint containers. More specifically, aspects of the invention include a paint container storing liquid paint, optionally with or without a propellant in a quantity sufficient to expel a substantial portion (e.g., at least half) of the paint therein. The paint container storing the paint can be sealed by a pierceable membrane, and can lack a valve disposed within an interior space storing the paint. An external valve body includes a liquid droplet production apparatus and a piercing member. The piercing member of the valve body pierces the pierceable membrane as a result of the valve body being installed onto the paint container, establishing fluid communication between the interior space storing the paint and the liquid droplet production apparatus. Embodiments of the liquid droplet production apparatus can include an electronic spray device having a vibrating perforate membrane used to generate liquid droplets. Gravity urges the paint toward the perforate membrane while the assembly of the paint container and the valve body is inverted (i.e., the interior space storing the paint is arranged at an elevation vertically above an elevation of the perforate membrane). Actuation of the liquid droplet production apparatus in response to manual selection of a button, switch or other input device causes the production of the paint droplets that, when expelled via the liquid droplet production apparatus, are deposited onto a surface.

BACKGROUND

It is well known in the art to dispense paint from a pressurized can using a laterally displaced nozzle integrated into the top of the can. An example of such a known apparatus is aerosol paint can 200, shown in FIG. 2, having laterally displaceable nozzle 202. While such aerosol paint can products have enjoyed wide commercial success, a challenge presented by such aerosol paint cans is that of disposal. Because the can is pressurized, limitations may be placed on how and where the used paint cans can be disposed. It can be difficult for the user to depressurize the paint can once the desired quantity of paint has been sprayed. A second problem is once the user has finished spraying the paint some amount of the paint typically remains in the can. Both of these conditions lead to problems when the user needs to dispose of the paint can. The paint can may explode if one tries to burn or crush it. The applied heat or the crushing action will increase the paint can's internal pressure and thus an explosion risk is presented. Also, the paint remaining in a paint can may represent a hazardous chemical or fire hazard and thus another disposal problem.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

An apparatus and method for dispensing paint from containers that provides an economical, reliable, and easy method of depressurizing the containers is desired. Limiting the presence of a propellant within a paint container may also be desired to avoid at least some of the difficulties that may be encountered when disposing of depleted paint containers.

According to some embodiments of this invention, a fluid dispensing apparatus dispenses a paint fluid from an associated paint container. The associated paint container includes an internal space storing paint. The internal space is substantially devoid of a propellant that is suitable to expel a substantial portion of the paint from the internal space. A pierceable membrane encloses internal space. The fluid dispensing apparatus includes a valve body defining a bore that extends at least partially through the valve body, and an adaptor including a piercing member positioned to pierce the pierceable membrane and establish fluid communication between the internal space and the bore. The adaptor also includes a releasable fastener that cooperates with a portion of the paint container to releasably couple the valve body to the paint container. A liquid droplet production apparatus is in fluid communication with the bore, and controls a discharge of the paint from the paint container. The liquid droplet production apparatus includes a perforate membrane, and an actuator that is selectively operable to vibrate the perforate membrane and cause liquid droplets of the paint to be emitted from the perforate membrane and projected generally away from the paint container.

According to other embodiments, a liquid container includes a housing defining an internal space storing a liquid to be dispensed as droplets. The internal space is substantially devoid of a propellant suitable to expel a substantial portion of the liquid from the internal space. A pierceable membrane encloses the internal space storing the liquid. A fluid dispensing apparatus includes a valve body defining a bore that extends at least partially through the valve body. An adaptor includes a piercing member extending at least partially through the pierceable membrane, establishing fluid communication between the internal space and the bore. The adaptor also includes a releasable fastener cooperating with a portion of the liquid container to releasably couple the valve body to the liquid container. A liquid droplet production apparatus is in fluid communication with the bore to control a discharge of the liquid from the liquid container. The liquid droplet production apparatus includes a perforate membrane, and an actuator that is selectively operable to vibrate the perforate membrane, and cause liquid droplets to be emitted from the perforate membrane and projected generally away from the liquid container.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
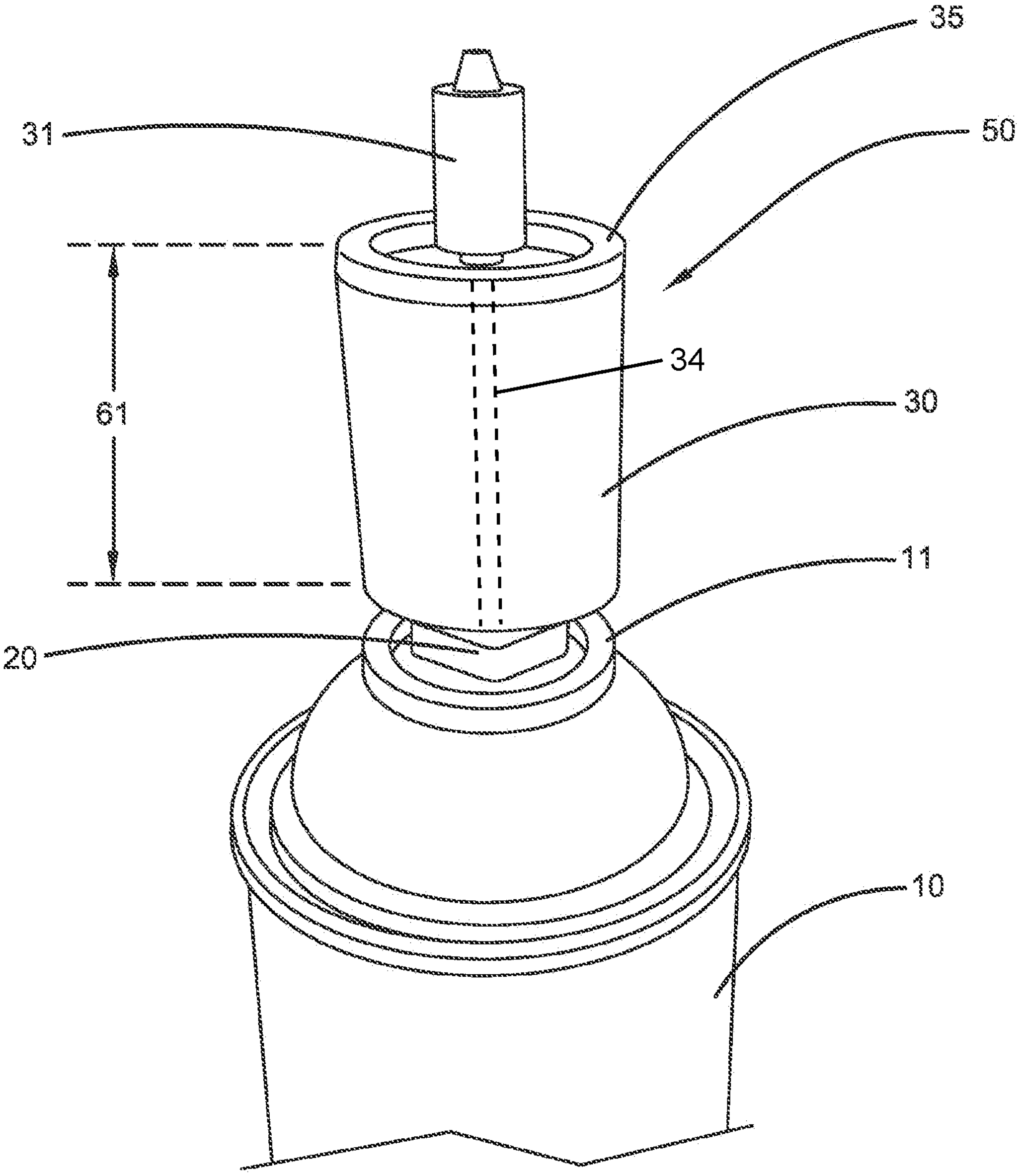
FIG. 1 is a perspective view of a fluid dispensing apparatus on which a valve body and an adaptor of a fluid dispensing apparatus is installed in accordance with some embodiments of this invention.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring now to the drawings wherein the showings are for purposes of illustrating embodiments of the invention only and not for purposes of limiting the same, and wherein like reference numerals are understood to refer to like components, FIG. 1 shows a perspective view of a pressurized paint container 10 equipped with a fluid dispensing apparatus 50 according to some embodiments of this invention. While the pressurized paint container shown is a can, this invention will work with any type, size and shape of pressurized paint container. The paint dispensed by the fluid dispensing apparatus 50 may be a pressurized paint fluid that is a liquid, gas, vapor, or a mixture thereof. While the fluid dispensing apparatus 50 is designed to dispense paint, it may have application to other fluids as well, to dispense droplets of any liquid and/or gas as a mist.

The fluid dispensing apparatus 50 may, in some embodiments, include a nozzle 31, a valve body 30, and an adaptor 20. The nozzle 31 may be similar to the nozzle 202 discussed above. For example, embodiments of such nozzles 31, 202 include laterally-displaceable nozzles that, when urged to be offset in a lateral direction relative to a longitudinal axis of the paint container 10, open an interior passage, described below, through which the paint is to travel to be expelled from the fluid dispensing apparatus 50.

Figure 3:
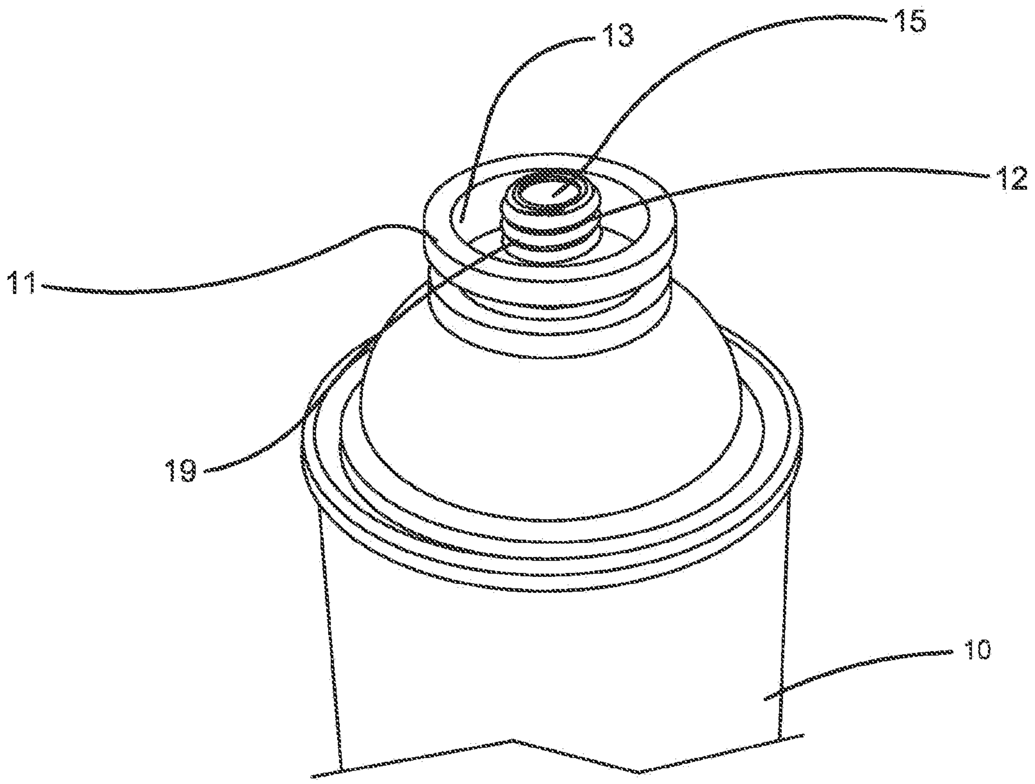
FIG. 3 is a perspective view of a paint container in accordance with some embodiments of this invention.
Figure 6:
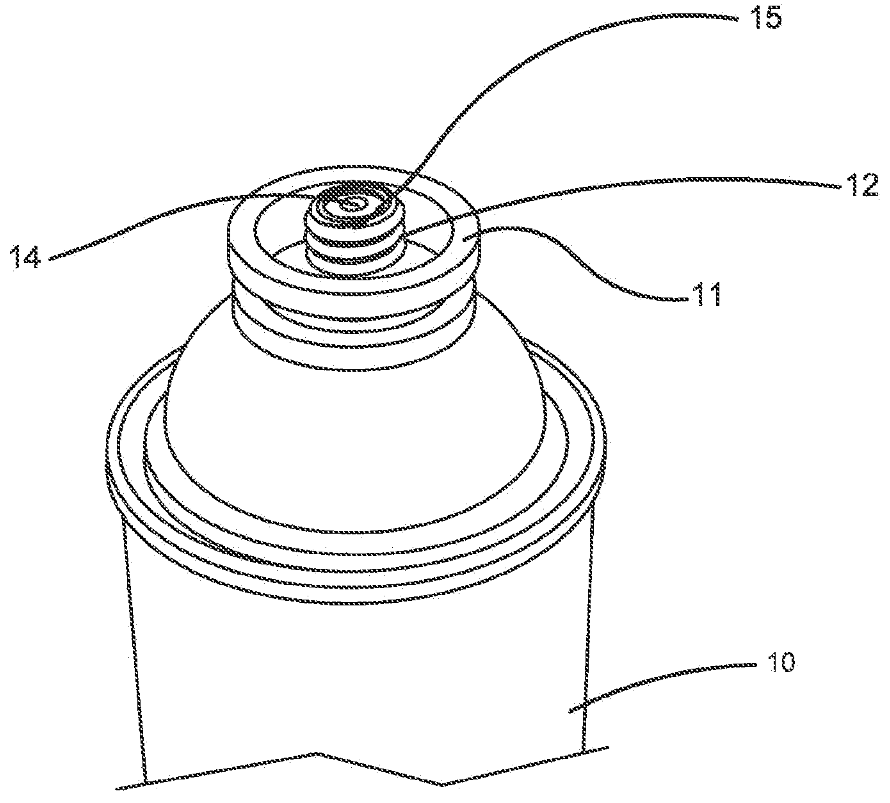
FIG. 6 shows a container in accordance with some embodiments of this invention with a pierceable membrane pierced.

With reference now to FIGS. 3 and 6, a container cap 11 is installed on the paint container 10 to contain the paint, or other liquid to be expelled, optionally in combination with a propellant. The container cap 11 may, in one embodiment, be fixedly joined to the top of the container 10 such as being crimped to a perimeter wall defining an aperture through which the paint and optional propellant are added to the container 10. The container cap 11 may be, in one embodiment, positioned substantially concentrically with the container's longitudinal axis. The container cap 11 may have a well 13, and a coupling surface 12 formed about a fluid passage bore 14 (visible in FIG. 6) through which the paint is expelled from the container 10. A membrane 15 forms an upper surface that closes and conceals the fluid passage bore 14 from view adjacent to the top of the coupling surface 12. For example, the membrane 15 may be pierceable and located with respect to the fluid passage bore 14 in such a manner as to seal fluid passage bore 14 and prevent fluid from exiting container 10 until the membrane 15 is pierced. FIG. 6 shows the membrane 15 in a pierced condition, which exposes fluid passage bore 14 to the ambient environment of the container 10.

The coupling surface 12 may be of any size, shape and relative position that cooperates with a portion of the fluid dispensing apparatus 50 to couple the fluid dispensing apparatus 50 to the container 10. According to the embodiment shown in FIGS. 3 and 6, the coupling surface 12 is cylindrical in shape, extending axially along a longitudinal axis of the container 10. A threaded region 19, as shown in FIG. 3, comprises external threading that cooperates with internal threading 57 (FIG. 4B) provided to a coupling element 21 of an adaptor 20, described below. For the embodiment shown, the coupling surface 12 is cylindrical in shape and the threaded region 19 includes threading formed along the exterior surface of the coupling surface 12, but the present disclosure is not so limited. Compatible regions of internal and external threading, or any other releasable fastener portions can be provided to the coupling surface 12 and adaptor 20 for removably coupling the fluid dispensing apparatus 50 to the container 10.

Removably coupling the fluid dispensing apparatus 50 to the container 10 involves establishing a substantially fluid-tight connection between the fluid dispensing apparatus 50 and the container 10, and allowing for the subsequent removal of the fluid dispensing apparatus 50 from the container 10 to be used with a different container 10. In other words, the fluid dispensing apparatus 50 is installable on a first container 10 to control the release of the paint from the container 10. When the container 10 is no longer in use, the fluid dispensing apparatus 50 can be unscrewed or otherwise removed from the container 10 to be installed on a second container 10.

Figure 4A:
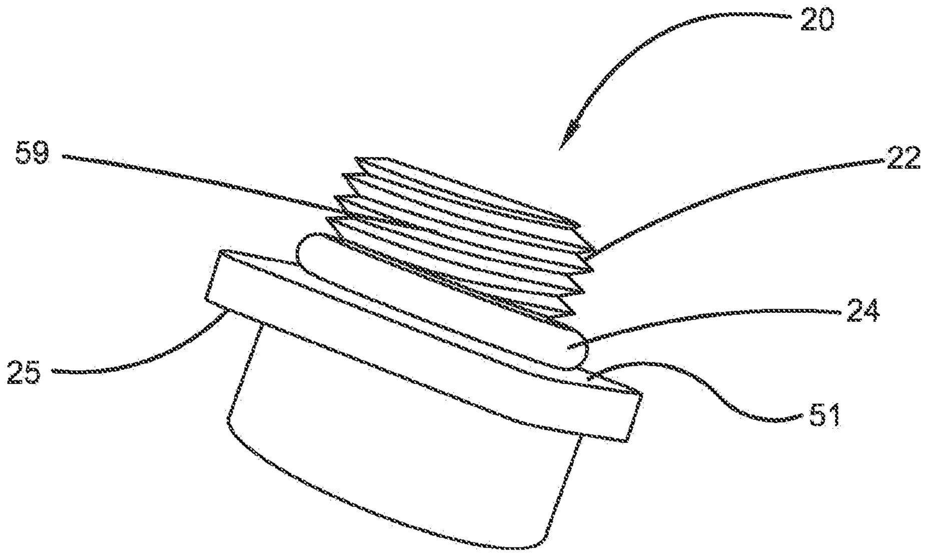
FIG. 4A is a perspective side view of an adaptor in accordance with some embodiments of this invention.
Figure 4B:
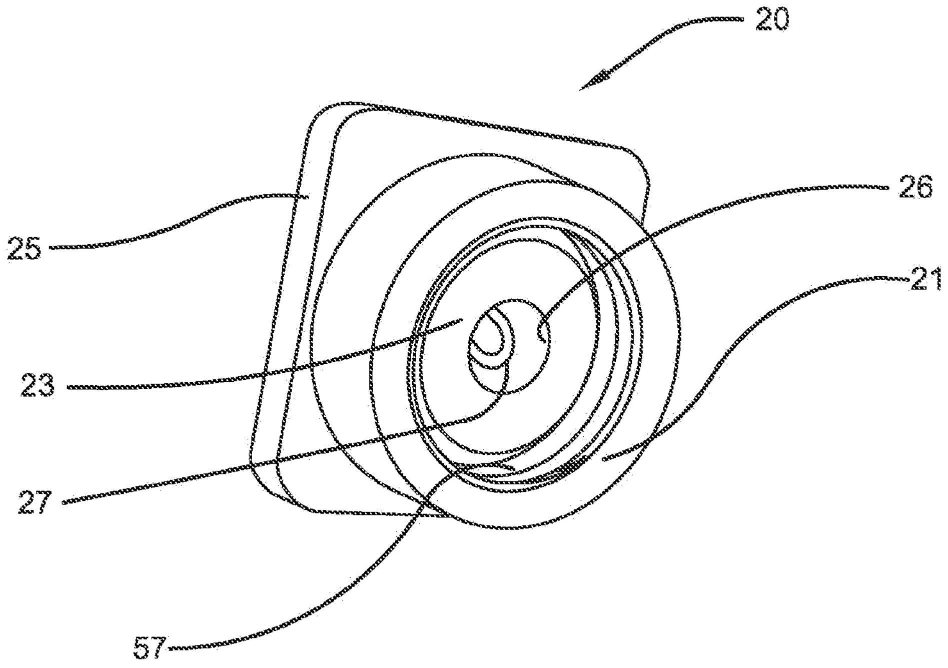
FIG. 4B is a perspective bottom view of an adaptor in accordance with some embodiments of this invention.

The adaptor 20, embodiments of which are illustrated in FIGS. 1, 4A, 4B and 6, defines a interior passage that extends between a top region and an opposing bottom region. As shown in FIG. 4B, the bottom region of the adaptor 20 includes a coupling element 21 that engages the coupling surface 12 of the container cap 11 to removably couple the fluid dispensing apparatus 50 to the container 10. For example, in the specific embodiment illustrated in the drawings, the coupling element 21 can be formed on an inner surface of an arcuate, optionally cylindrical-shaped wall adjacent to the bottom of the adaptor 20. The internal threading 57 forming a threaded region of the adaptor 20 is compatible with the threaded region 19 of the coupling surface 12 provided to the container cap 11.

The adaptor 20 includes a fluid passage bore 26 that extends between the top region and the bottom region of the adaptor 20. A piercing member 27 is arranged at least partially within the fluid passage bore 26, as shown in FIG. 4B, to pierce the membrane 15. The membrane 15 is shown unpierced in FIG. 3 and pierced in FIG. 6. The piercing member 27, in some embodiments, may be located concentric with the longitudinal axis of fluid passage bore 26. A distal end of the piercing member 27 includes a tip that can be sharp, or comes to a point to facilitate the puncturing of the membrane 15 during installation of the fluid dispensing apparatus 50 on the can 10. The distal end of the piercing member 27 can optionally protrude beyond an end of the fluid passage bore 26, or extend a suitable distance within the fluid passage bore 26 to extend at least partially through the membrane 15 when the fluid dispensing apparatus 50 is fully installed on the container 10. Some embodiments of the piercing member 27 can be hollow, defining an interior passage through which paint expelled from the container 10 passes toward the nozzle 31 provided to the fluid dispensing apparatus 50.

The adaptor 20 can also optionally include a seal 23, such as a ring of an elastically compressible material for example, that interferes with fluid flow between the container 10 and the adaptor 20, promoting fluid flow of the paint through the fluid passage bore 26. The seal 23 may be formed of an elastomeric material, and is compressed between a portion of the container cap 11, such as an upper region of the coupling surface 12 for example, and a portion of the adaptor 20, such as a portion of the coupling element 21 for example.

As shown in FIG. 4A, a coupling element 22 can be located adjacent to the top of the adaptor 20. In the illustrated embodiment of FIG. 4A, the coupling element 22 is formed as external threading 59 formed along an outward-facing cylindrical shaped portion of the adaptor 20, for example. The coupling element 22 engages with a compatible region of the valve body 30, as will be discussed further below. A seal 24 may be used to seal the connection between the top of the adaptor 20 and the bottom of the valve body 30. For the embodiment shown, the seal 24 is an O-ring received around the cylindrically shaped portion of the adaptor 20 that has the coupling element 22. The seal 24 can be formed of an elastomeric material, for example. The adaptor 20 can optionally include a shoulder 25 extending outwardly, as shown. The top of the shoulder 25 may have a surface 51 that acts as a stop that contacts a surface of the valve body 30 when the adaptor 20 and valve body 30 are attached together.

Figure 2:
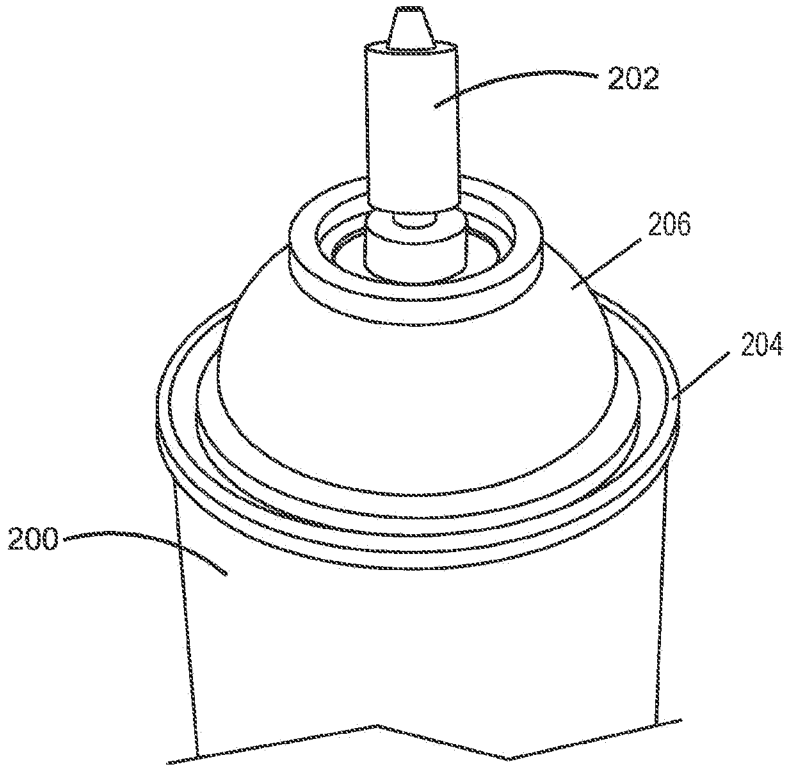
FIG. 2 PRIOR ART
FIG. 2 is a perspective top view showing a prior art paint can and nozzle.
Figure 5:
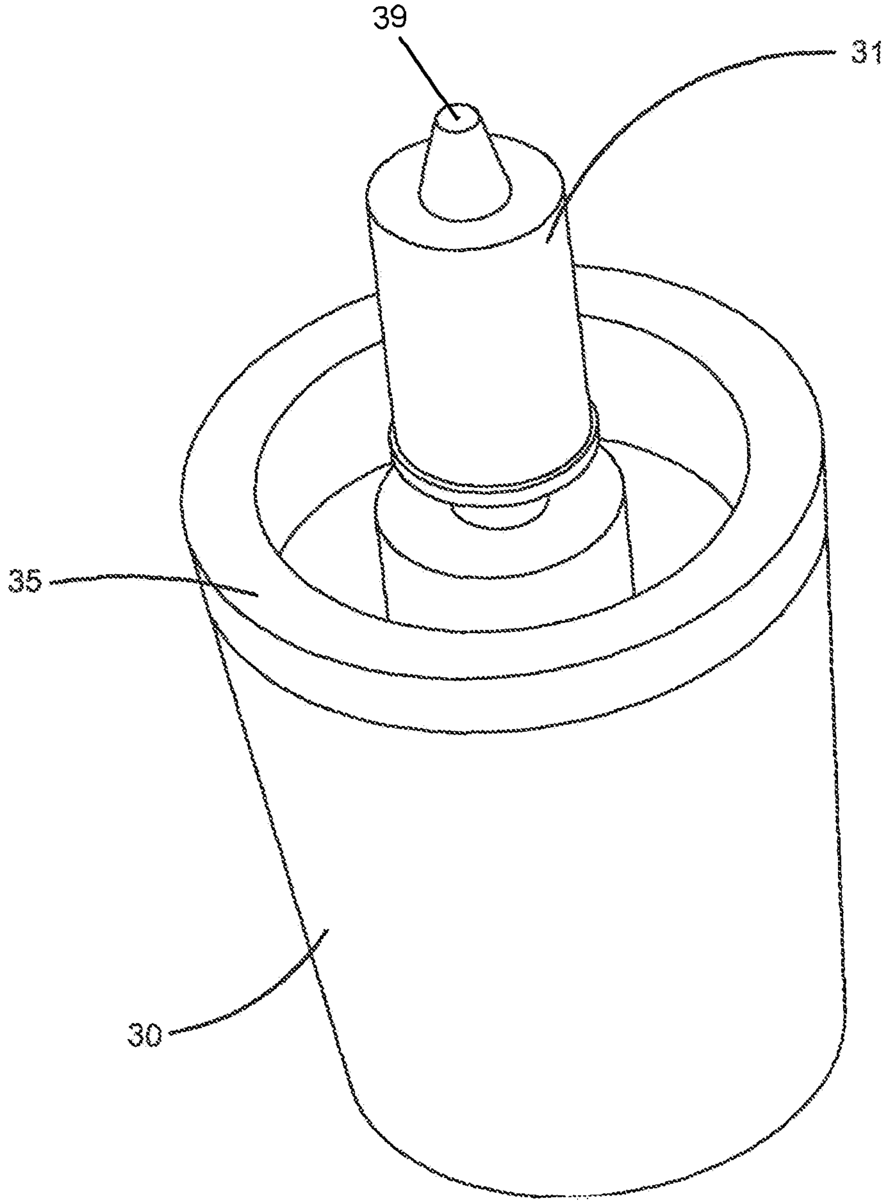
FIG. 5 is a perspective view of a dispensing apparatus in accordance with some embodiments of this invention.

With reference to FIGS. 1 and 5, the valve body 30 may have a valve cap 35 on its top to receive the nozzle 31, for example. In one embodiment, shown, the valve cap 35 is similar in design to the top of the can 200, just below the nozzle 202, shown in FIG. 2. The valve body 30 may be substantially cylindrical in shape and may have a height 61. The height 61 may range between 1.0 to 4.0 inches. Valve body 30 may have a fluid passage bore 34, shown in hidden lines in FIG. 1, that extends from a bottom to a top of the valve body 30, defining a fluid flow path through the valve body through which paint passes from the container 10 to the ambient environment where the substrate being painted is located. In one embodiment, the bore 34 may be centered along the valve body's longitudinal axis. A coupling element 33 may be located on a bottom surface, as shown. In one specific embodiment, shown, coupling element 33 may be formed on an inner cylindrical shaped portion of valve body 30 and may have a threaded section 37. The coupling element 33 may be used to engage with coupling element 22 of the adaptor 20. In one specific embodiment, threaded section 37 engages threaded section 59 to attach the valve body 30 to the adaptor 20. The valve body 30 may be formed of any material chosen with the sound judgment of a person of skill in the art.

As shown in FIG. 5, the nozzle 31 including a fluid passage bore 39 is joined to the valve cap 35. Nozzle 31 may dispense paint out of the valve body 30 to the ambient when the nozzle 31 is operated, such as by laterally displacing the nozzle 31 relative to the valve body 30 by manually-generated forces, for example. Nozzle 31 can optionally be configured with a biased position such that when no force is applied, nozzle 31 returns to a position that prevents fluid communication between the interior space of the container 10 and the central bore 34.

Figure 7:
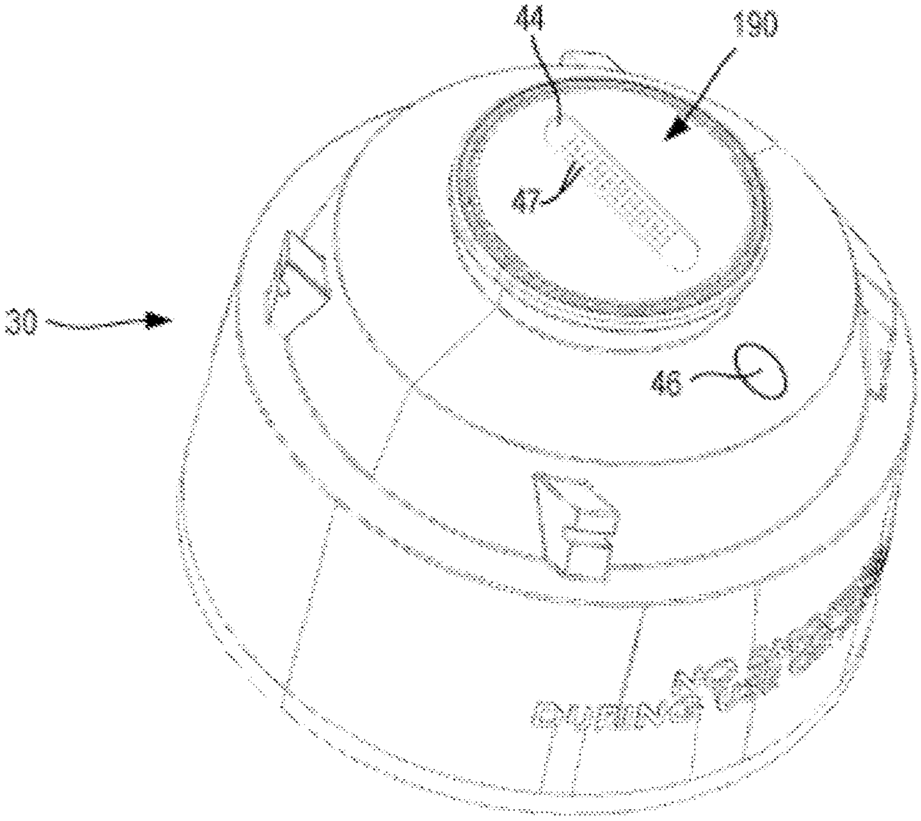
FIG. 7 is a top perspective view of an alternate embodiment of a valve body of a fluid dispensing apparatus.

FIG. 7 shows another embodiment of the valve body 30 provided with a liquid droplet production apparatus 190. The liquid droplet production apparatus 190 can be used to dispense paint from containers 10 that lack a propellant. Instead of being forced through the nozzle 31 by a propellant, the paint is pooled on a surface of a perforate membrane 44, which is rapidly vibrated to cause droplets of paint to be expelled through apertures 47 formed in the membrane. According to such embodiments, the paint is caused to flow toward, and pool on the surface of the membrane 44 by the force of gravity when the container 10 equipped with the valve body 30 of FIG. 7 is inverted, meaning at least a portion of the container 10 is at an elevation that is vertically above the elevation of the valve body 30.

The present embodiment of the valve body 30 is compatible with an adaptor 20 to be releasably coupled to a container cap 11 of a container 10 as described above. Instead of a nozzle 31 that is to be laterally displaced relative to a longitudinal axis to open an internal passageway forming a fluid flow path through the fluid dispensing apparatus 50, however, the valve body 30 of FIG. 7 includes the liquid droplet production apparatus 190 to regulate the discharge of paint from the container 10.

The liquid droplet production apparatus 190 uses ultrasonic vibration to generate liquid droplets of paint. Generally, the liquid droplet production apparatus 190 includes a membrane 44 defining a plurality of apertures 47. Liquid paint 204 is pooled on an interior surface 206 (FIG. 8) of the membrane 44 by the force of gravity. An actuator 201 vibrates the membrane 44, so that the vibration causes liquid droplets of paint to be ejected from the apertures 47 at the other, exterior surface 208 of the membrane 44, and deposited onto a substrate being painted.

Gravity urges the paint toward the perforate membrane while the assembly of the paint container and the valve body 30 is inverted (e.g., a portion of the paint container is at a vertical elevation that is vertically above an elevation of a portion of the valve body 30). At least one, and optionally a plurality of apertures 47 are formed in the perforate membrane 44. The plurality of apertures 47 can optionally be arranged in a regular array as shown in FIG. 7. Operation of the liquid droplet production apparatus 190 can be initiated in response to manual selection of a button 46, switch or other input device to cause production of the paint droplets that, when expelled via the liquid droplet production apparatus 190, are deposited onto a surface.

Figure 8:
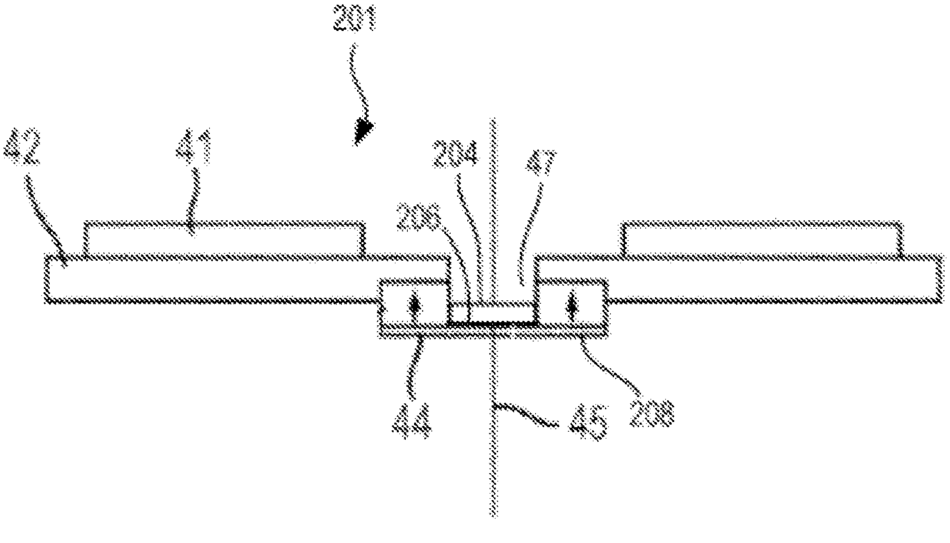
FIG. 8 shows a sectional view of a magnetic attachment of a perforate membrane to a bending mode actuator according to an embodiment of a liquid droplet production apparatus.

An example of the actuator 201 is shown in FIG. 8. This device combines a bending mode actuator with the separable perforate membrane 44. The actuator 201 can include a piezoelectric layer 41 bonded to a substrate 42 which can be made of a metal such as steel. An on-board power source such as a battery (not shown) is selectively connected to the actuator 201, to supply the electric energy required to energize the piezoelectric layer 41 in response to selection of the button 46.

Examples of the substrate 42 material include a hard magnet, in which case separate magnetic elements may not be required. Magnets provide an attractive force to hold a perforate membrane 44 in place. The perforate membrane 44 can be a ferromagnetic material, so that an attractive force is provided. In a preferred embodiment, this material is a magnetic stainless steel, as high attachment forces are provided by materials with high saturation inductions. This bending mode actuator can be configured in an axi-symmetric geometry, wherein the line 45 shows the axis of symmetry, or in linear format, where the line 45 is the center-line of an actuator 201 that extends out of the page.

Figure 9:
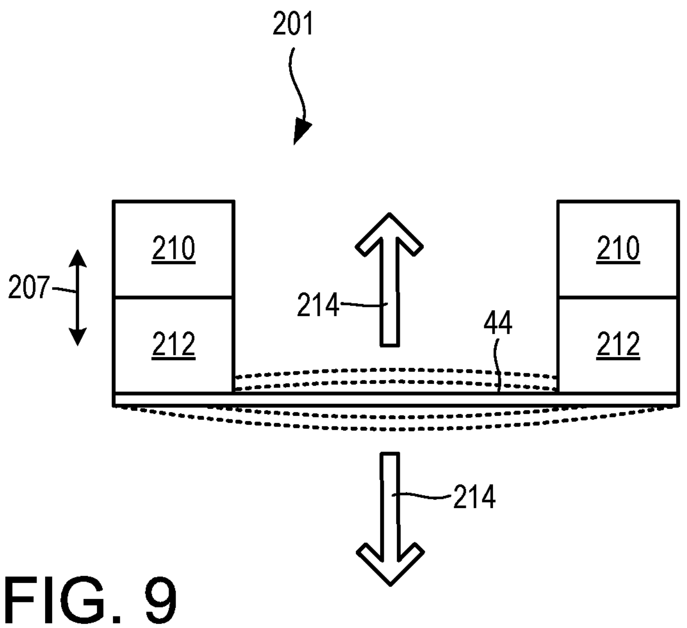
FIG. 9 is a schematic view of an actuator having a longitudinal configuration.

Another example of the actuator 201, shown in FIG. 9, is a linear actuator 201 that includes an active component 210 capable of being energized to generate the cyclical forces that vibrate the membrane 44 at a frequency suitable to cause liquid drops of paint to be emitted from the external surface of the membrane 44. The active component 210 generates forces in directions, indicated by double arrow 207, general perpendicular to the major plane of the membrane 44. Examples of the active component 210 of the actuator 201 include, but are not limited to piezoelectric, electrostrictive or magnetostrictive (i.e. a material that changes shape in response to an applied electric or magnetic field, henceforth referred to as the active component) devices.

The active component 210 of the actuator 201 is supported by a metallic or other support material referred to as a "passive component 212," which is also coupled to the membrane 44. The membrane 44 can be permanently attached to the passive component 212 through a bond produced by an adhesive, laser welding, brazing, soldering, or and the like. This attachment mechanism must transmit a time varying force across the interface, where the force is primarily normal to the bonding surface.

In addition to supporting the active component 210 and the membrane 44, the passive component 212 deforms in response to the forces exerted on it by the active component 210. Deformation of the passive component 212 amplifies the vibratory forces produced by the active component 210, causing the membrane 44 to repeatedly flex in directions (indicated by arrows 214) parallel to the directions 207 of the forces generated by the active component 210, thereby causing the liquid droplets of paint to pass through the apertures 47. The membrane 44 may entirely vibrate in phase, have one wavelength of motion across its radius (i.e. the central region may be out of phase with the periphery, as shown in FIG. 9), or more than one wavelength of motion.

Figure 10:
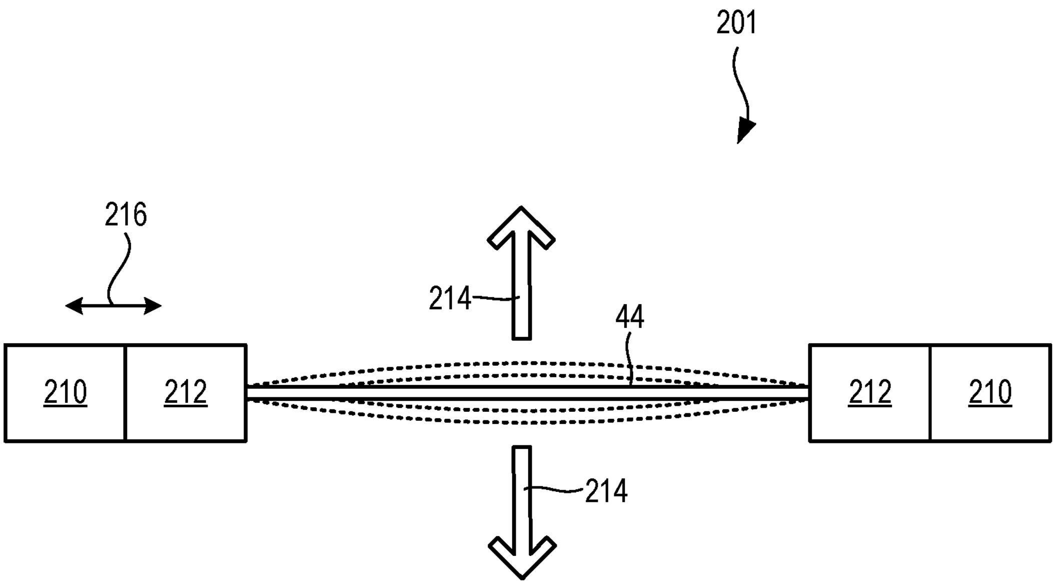
FIG. 10 is a schematic view of an actuator having a breathing mode configuration.

Another example of the actuator 201 includes a breathing mode configuration, shown in FIG. 10. Similar to the longitudinal configuration discussed above, the breathing mode configuration of the actuator 201 includes the active component 210 and the passive component 212. However, energizing the active component 210 causes cyclical vibrations in a direction, indicated by arrows 216, that is substantially parallel to a major plane of the membrane 44. According to the present embodiment, the in-plane directions 216 of motion generates vibrations of the membrane 44 in directions 214 substantially normal to the in-plane directions 216 of vibration generated by the active component 210.

Although specific embodiments of the actuator 201 are described herein for the sake of clarity, the present disclosure is not limited to only those configurations. Any actuator 201 that is suitable to generate rapid flexing of the membrane 44 is within he scope of the claimed subject matter unless expressly stated otherwise.

In use, the coupling element 21 of the adaptor 20 provided to the valve body 30 of FIG. 7 is screwed or otherwise installed on the coupling surface 12 of the container cap 11 enclosing a container 10 of paint or other liquid to be dispensed. The paint or other liquid can optionally be stored in the container 10 without a chemical propellant such as a hydrocarbon or hydrofluorocarbon, for example, that expands in response to a change in pressure to force the paint through the nozzle 31.

The adaptor 20 can be coupled to the valve body 30 in a fixed relative angular orientation. For example, a portion of the adaptor can be embedded in an underside of the valve body 30. As the valve body 30 is pivotally adjusted about a central axis of rotation, the threading 57 of the connector element 21 cooperates with the threaded region 19 of the connector surface 12 of the container cap to urge the valve body 30 and adaptor toward the container 10.

The piercing member 27 of the valve body 30 pierces the pierceable membrane 15 as a result of the valve body 30 being installed a suitable extent onto, and urged toward the container 10. Once the membrane 15 is pierced, fluid communication is established through the hollow piercing member 27 between the interior space of the container 10 storing the paint and the liquid droplet production apparatus 190 of the valve body 30. The seal 23 is compressed between a portion of the adaptor 20 and a portion of the container cap 11 to interfere with an escape of the paint between the adaptor 20 and the container cap 11.

When the container 10 equipped with the valve body 30 including the liquid droplet production apparatus 190 is inverted, paint stored in the container 10 is caused to flow through the piercing member 27 under the force of gravity, and pool on the interior surface 206 of the membrane 44. Pressing the button 46 or other activation of the input device provided to the valve body 30 connects the actuator 201 to an onboard power source, such as a battery for example, provided to the valve body 30, energizing the actuator 201. The actuator 201 causes vibration of the membrane 44 on which the paint has pooled, causing the membrane 44 to vibrate at a frequency to expel a stream of paint droplets at a suitable flow rate suitable for the specific painting or other coating operation. Releasing the button 46 or other input device terminates vibration of the membrane 44, ceasing the deposition of paint droplets on the substrate.

If the container 10 remains inverted, liquid paint continues to pool on the interior surface 206 of the membrane 44, which is stationary relative to the valve body 30 while the actuator 201 is de-energized. In the absence of the vibrational forces generated by the actuator 201, the apertures 47 are closed, interfering with the flow of paint through the membrane 44. Returning the container 10 to an upright orientation allows at least a portion of the paint that pools on the interior surface 206 of the membrane 44 to flow through the interior passage defined by the piercing member 27 under the force of gravity, back to the interior space of the container 10.

After emission of the liquid paint in the container 10 is complete, the valve body 30 can be pivotally adjusted relative to the container 10 to cause the cooperating threading of the adaptor 20 and the coupling element 12 to urge the valve body 30 away from the container 10. Once the threading of the adaptor 20 has been fully disengaged from the threading of the coupling element 12, the valve body 30 can be separated from the container 10, and installed on a second container 10 to regulate the discharge of paint from the second container. Thus, the fluid dispensing apparatus 50 is reusable, limiting waste and allowing the container 10 to be thoroughly emptied in preparation for disposal or recycling.

The foregoing description of examples and embodiments have been presented for purposes of illustration and description. It is not intended to be exhaustive or limiting to the forms described. Numerous modifications are possible in light of the above teachings. Some of those modifications have been discussed, and others will be understood by those skilled in the art. The examples and embodiments were chosen and described in order to best illustrate principles of various examples as are suited to particular uses contemplated. The scope is, of course, not limited to the examples and embodiments set forth herein, but can be employed in any number of applications and equivalent devices by those of ordinary skill in the art. It will be apparent to those skilled in the art that the above methods and apparatuses may incorporate changes and modifications without departing from the general scope of this invention. It is intended to include all such modifications and alterations.

The invention claimed is:

1. An apparatus, comprising:

a container cap with a pierceable membrane configured to be coupled with an associated fluid container, the associated fluid container comprising an internal space for storing a fluid, wherein the internal space is devoid of a propellant suitable to expel a portion of the fluid from the internal space, the internal space being enclosed by the container cap;

a valve body defining a bore that extends at least partially through the valve body; an adaptor comprising a piercing member positioned to pierce the pierceable membrane and establish fluid communication between the internal space and the bore extending at least partially through the valve body, the adaptor comprising a releasable fastener that releasably cooperates with the container cap to releasably couple the valve body to the fluid container; and a liquid droplet production apparatus in fluid communication with the bore to control a discharge of the fluid from the fluid container, the liquid droplet production apparatus comprising a perforate membrane that defines a plurality of apertures, and an actuator that is selectively operable to vibrate the perforate membrane and cause liquid droplets of the fluid to be emitted through the plurality of apertures as a result of vibration of the perforate membrane from the perforate membrane and projected generally away from the fluid container.

2. The apparatus of claim 1, wherein the piercing member defines an internal passage defining a portion of a flow path of the fluid from the container to the liquid droplet production apparatus.

3. The apparatus of claim 1, wherein the perforate membrane defines a plurality of apertures that emit the liquid droplets of fluid as a result of vibration of the perforate membrane.

4. The apparatus of claim 1, wherein the actuator comprises an active component that, when energized, vibrates along an axis extending in a first direction, and causes the perforate membrane to vibrate in a second direction that is parallel with the first direction.

5. The apparatus of claim 4, wherein the active component comprises at least one of a piezoelectric, an electrostrictive and a magnetostrictive material.

6. The apparatus of claim 1, wherein the actuator comprises an active component that, when energized, vibrates along an axis extending in a first direction, and causes the perforate membrane to vibrate in a second direction that is perpendicular to the first direction.

7. The apparatus of claim 6, wherein the active component comprises at least one of a piezoelectric, an electrostrictive and a magnetostrictive material.

8. The apparatus of claim 1, further comprising an input device that is selectable to energize the actuator and commence emission of the fluid from the perforate membrane.

9. The apparatus of claim 8, wherein deselection of the input device de-energizes the actuator, and terminates emission of the fluid from the perforate membrane.

10. The apparatus of claim 1, the container cap further comprises a coupling surface having a threaded region, and the adapter further comprises a coupling element that engages the coupling surface, the coupling element comprises internal threading that is compatible with the threaded region of the coupling surface.

11. An apparatus, comprising:

a container cap with a pierceable membrane configured to be coupled with an associated liquid container, the associated liquid container comprising an internal space for storing a liquid, wherein the internal space is devoid of a propellant suitable to expel a portion of the liquid from the internal space, the internal space being enclosed by the container cap;

a valve body defining a bore that extends at least partially through the valve body; an adaptor comprising a piercing member positioned to pierce the pierceable membrane and establish liquid communication between the internal space and the bore extending at least partially through the valve body, the adaptor comprising a releasable fastener that releasably cooperates with the container cap to releasably couple the valve body to the liquid container; and a liquid droplet production apparatus in liquid communication with the bore to control a discharge of the liquid from the liquid container, the liquid droplet production apparatus comprising a perforate membrane that defines a plurality of apertures, and an actuator that is selectively operable to vibrate the perforate membrane and cause liquid droplets of the liquid to be emitted through the plurality of apertures as a result of vibration of the perforate membrane from the perforate membrane and projected generally away from the liquid container.

12. The apparatus of claim 11, wherein the piercing member defines an internal passage defining a portion of a flow path of the liquid from the container to the liquid droplet production apparatus.

13. The apparatus of claim 11, wherein the perforate membrane defines a plurality of apertures that emit the liquid droplets of liquid as a result of vibration of the perforate membrane.

14. The apparatus of claim 11, wherein the actuator comprises an active component that, when energized, vibrates along an axis extending in a first direction, and causes the perforate membrane to vibrate in a second direction that is parallel with the first direction.

15. The apparatus of claim 14, wherein the active component comprises at least one of a piezoelectric, an electrostrictive and a magnetostrictive material.

16. The apparatus of claim 11, wherein the actuator comprises an active component that, when energized, vibrates along an axis extending in a first direction, and causes the perforate membrane to vibrate in a second direction that is perpendicular to the first direction.

17. The apparatus of claim 16, wherein the active component comprises at least one of a piezoelectric, an electrostrictive and a magnetostrictive material.

18. The apparatus of claim 11, further comprising an input device that is selectable to energize the actuator and commence emission of the liquid from the perforate membrane.

19. The apparatus of claim 18, wherein deselection of the input device de-energizes the actuator, and terminates emission of the liquid from the perforate membrane.

20. The apparatus of claim 11, the container cap further comprises a coupling surface having a threaded region, and the adapter further comprises a coupling element that engages the coupling surface, the coupling element comprises internal threading that is compatible with the threaded region of the coupling surface.

* * * * *